(12) United States Patent
Valavala et al.

(10) Patent No.: US 11,453,531 B2
(45) Date of Patent: Sep. 27, 2022

(54) DOSING CAP WITH ADJUSTABLE VOLUME

(71) Applicant: Dow Global Technologies LLC, Midland, MI (US)

(72) Inventors: Pavan Valavala, Lake Jackson, TX (US); Marc S. Black, Midland, MI (US); Piyush Soni, Midland, MI (US); Wenbo Xu, Lake Jackson, TX (US); Hieu Truong, Lake Jackson, TX (US); Sam L. Crabtree, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/418,473

(22) PCT Filed: Dec. 23, 2019

(86) PCT No.: PCT/US2019/068349
§ 371 (c)(1),
(2) Date: Jun. 25, 2021

(87) PCT Pub. No.: WO2020/142315
PCT Pub. Date: Jul. 9, 2020

(65) Prior Publication Data
US 2022/0073241 A1 Mar. 10, 2022

Related U.S. Application Data

(60) Provisional application No. 62/786,872, filed on Dec. 31, 2018.

(51) Int. Cl.
*B65D 47/08* (2006.01)
*B65D 47/20* (2006.01)
*G01F 11/28* (2006.01)

(52) U.S. Cl.
CPC ........ *B65D 47/2075* (2013.01); *G01F 11/288* (2013.01); *B65D 47/0838* (2013.01);
(Continued)

(58) Field of Classification Search
CPC ........ B65D 47/2075; B65D 2251/0025; B65D 2251/0087; B65D 47/0838; G01F 11/288
See application file for complete search history.

(56) References Cited

U.S. PATENT DOCUMENTS 4,875,603 A   10/1989  Weinstein
4,941,598 A    7/1990  Lambelet, Jr. et al.
(Continued)

FOREIGN PATENT DOCUMENTS

DE   20319174 U1   2/2004
FR    2671538 A1   7/1992
JP   H08-26311 A   1/1996

*Primary Examiner* — Frederick C Nicolas
(74) *Attorney, Agent, or Firm* — Quarles & Brady LLP

(57) ABSTRACT

The present disclosure is directed to a dosing cap (10). In an embodiment, the dosing cap (10) includes (A) a collar member (12). The collar member (12) has an annular skirt (18) depending from a base (16)(B). An inner surface of the skirt has a securing member for securing the collar member to a neck (21) of a container (20). The base (B) has (i) a top surface (30) and a bottom surface (32), (ii) a valve seat (34) is present on the top surface of the base. The valve seat has a center channel (36), and a radial channel (38), the channels extend through the base. The dosing cap includes (C) a plug member (40). The plug member is composed of a polymeric material. The plug member has the following components in inter-connected relationship: a head (42), a body (44), a leg (46), an ankle (48), and a flexible foot (50). The leg extends through the center channel, such that the head opposes the valve seat on the top surface of the base and the foot opposes the bottom surface of the base. The dosing cap further includes (D) a cap member (112) having an annular sidewall (118) extending from a dispensing element (114). An inner surface of the annular sidewall has an attachment member adjustably attached to a reciprocal attachment member on an outer surface of skirt. The dosing cap includes (E) a metering chamber (120). The metering chamber is formed by an enclosed volume between the cap member and the base. The
(Continued)

dispensing element (F) permits flow of a fluid from the metering chamber.

14 Claims, 11 Drawing Sheets

(52) U.S. Cl.
CPC ............... *B65D 2251/0025* (2013.01); *B65D 2251/0087* (2013.01)

(56) References Cited

U.S. PATENT DOCUMENTS

| | | |
|---|---|---|
| 5,636,765 A | 6/1997 | DeJonge |
| 5,677,383 A | 10/1997 | Chum et al. |
| 6,003,728 A | 12/1999 | Elliott |
| 6,111,023 A | 8/2000 | Chum et al. |
| 6,142,345 A * | 11/2000 | Laible .................. B67D 7/0277 222/189.1 |
| 6,644,471 B1 | 11/2003 | Anderson |
| 6,644,510 B2 * | 11/2003 | Kawolics ................ F16K 17/02 222/105 |
| 6,984,695 B2 | 1/2006 | Brown et al. |
| 7,608,668 B2 | 10/2009 | LiPiShan et al. |
| 7,815,072 B2 | 10/2010 | Webster et al. |
| 8,353,428 B2 * | 1/2013 | Pritchard ............. B67D 3/0045 222/105 |
| 2003/0150887 A1 * | 8/2003 | Laible .................. B67D 7/0294 222/529 |
| 2005/0139622 A1 | 6/2005 | Saulle |
| 2014/0231462 A1 | 8/2014 | Ray et al. |
| 2021/0389166 A1 * | 12/2021 | Valavala ............... G01F 11/263 |

* cited by examiner

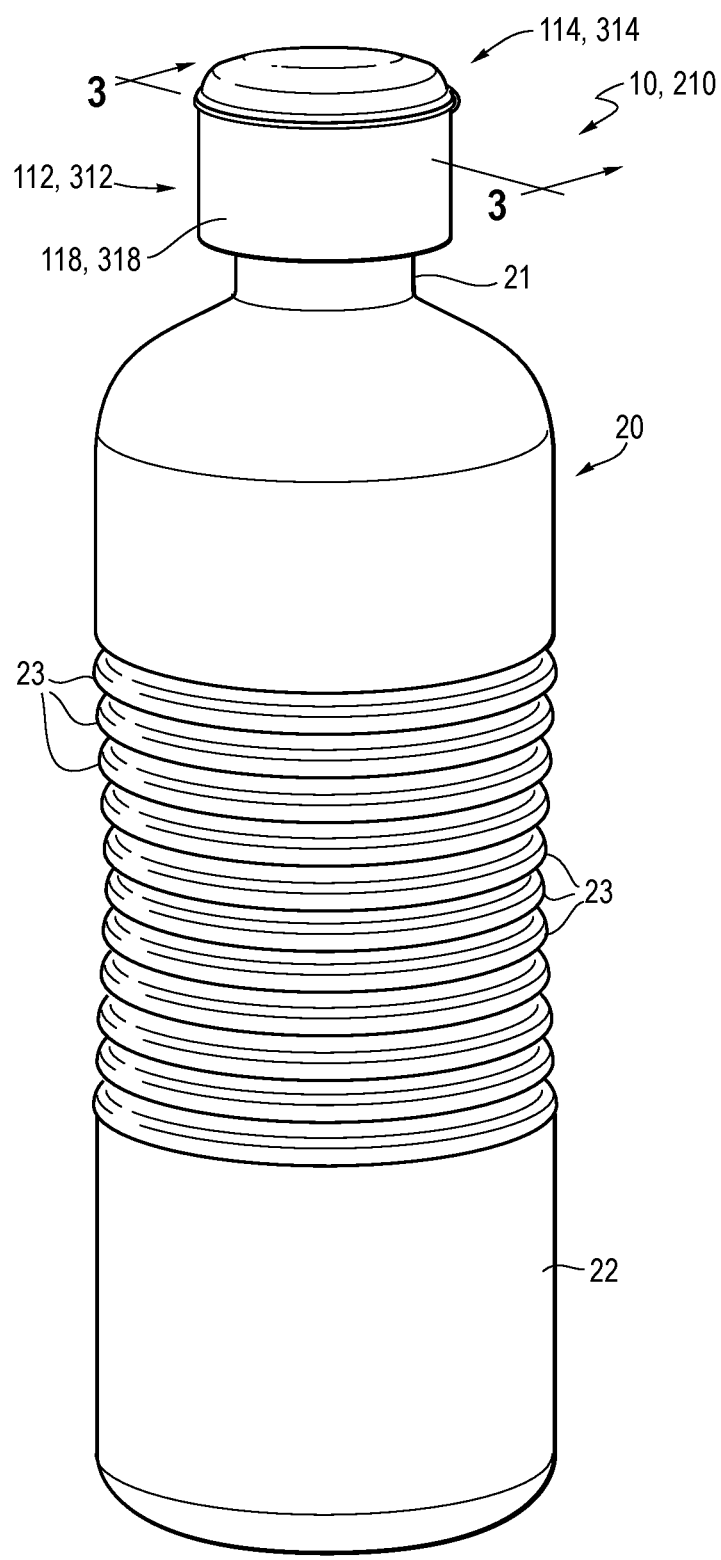

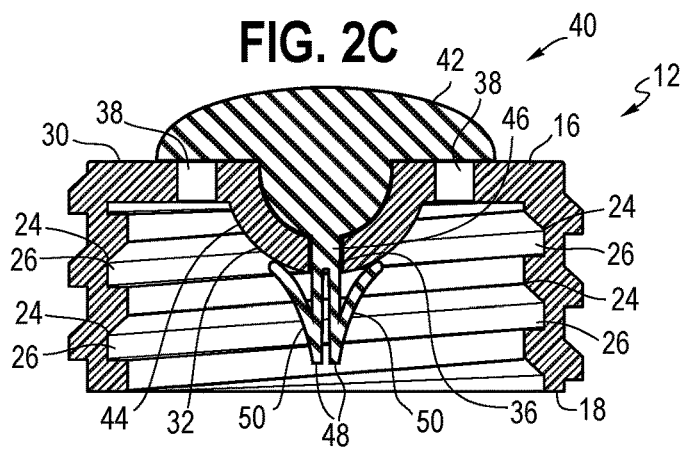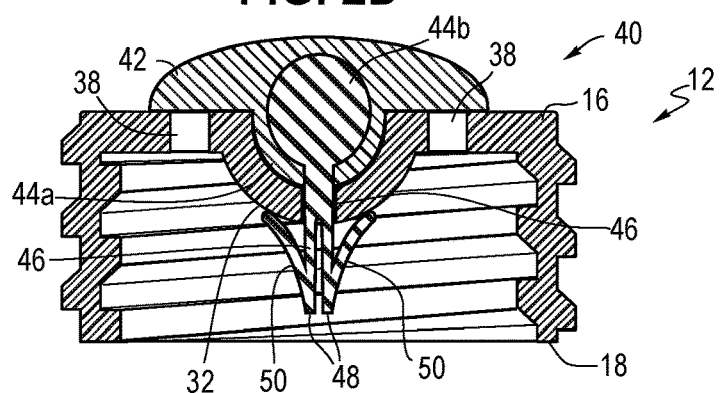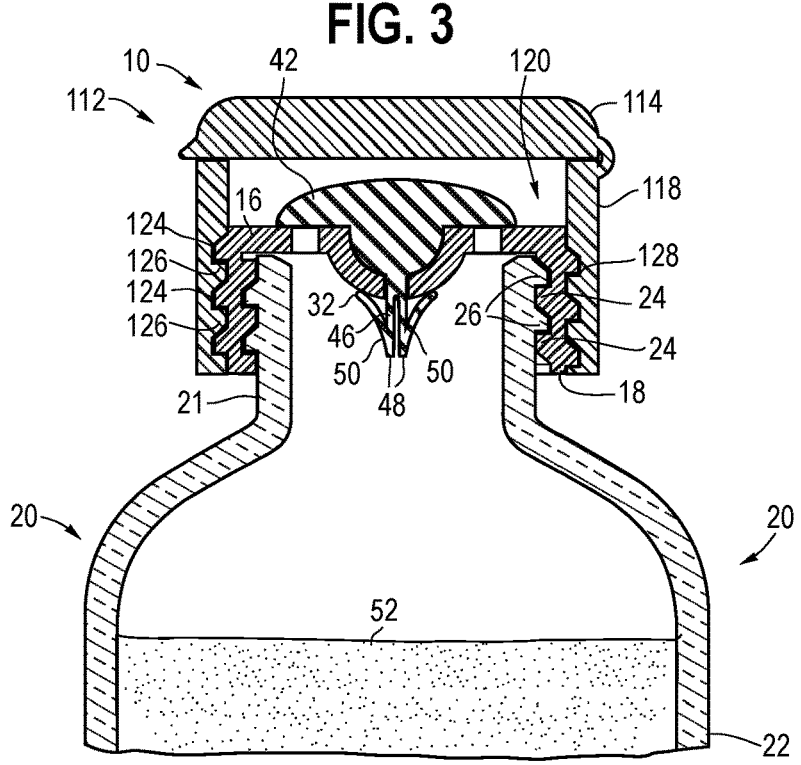

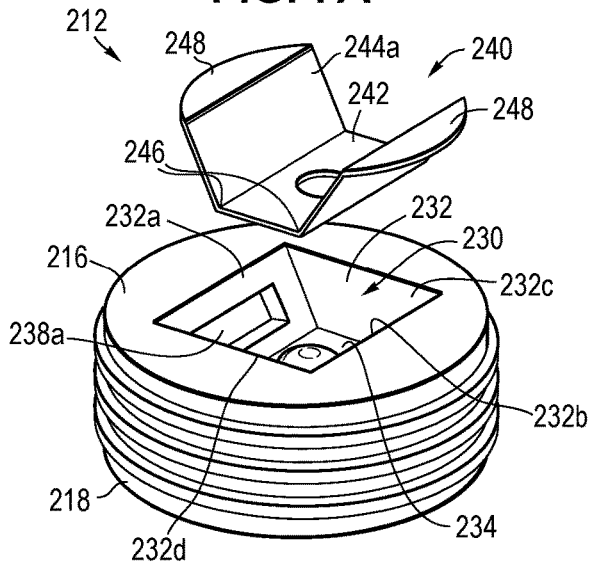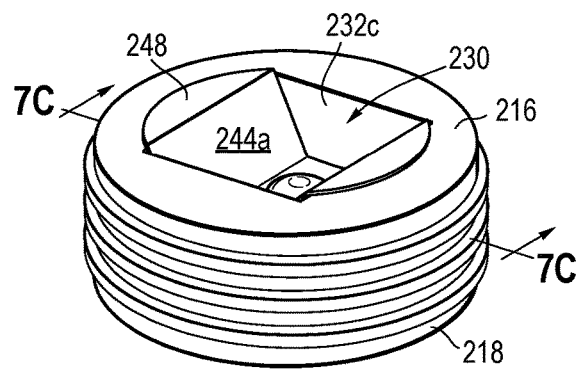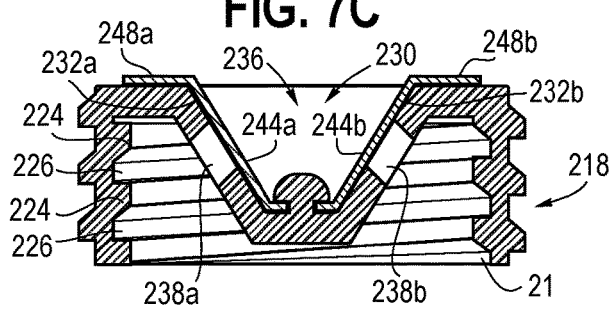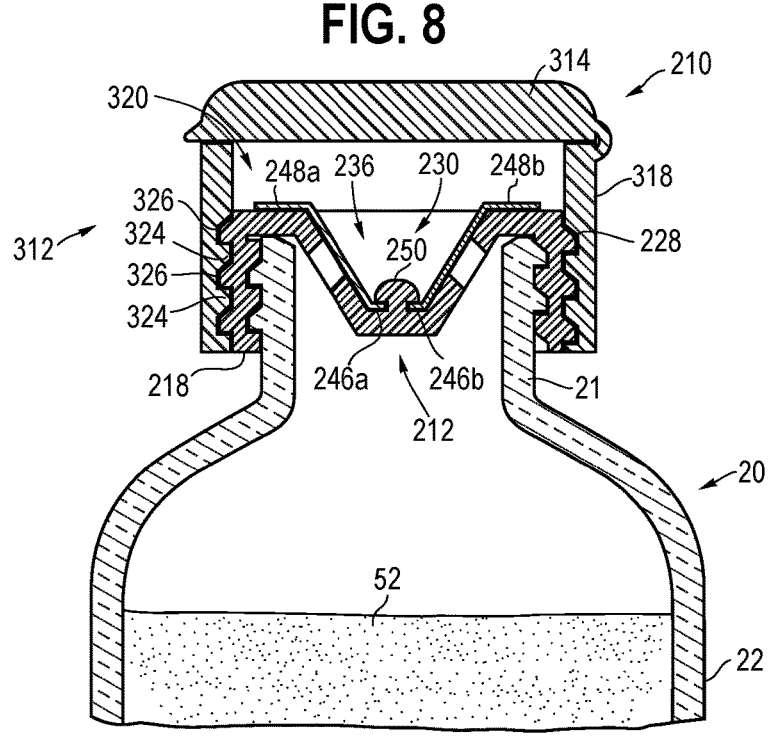

DOSING CAP WITH ADJUSTABLE VOLUME

Common in today's "on-the-go" consumer marketplace is the squeeze bottle. The conventional squeeze bottle finds utility in countless applications for the storage and dispensing of liquids—from bottled water and sports beverages to mouthwash, shampoo, and motor oil. The typical squeeze bottle includes a flexible (squeezable) body made of a flexible plastic material and a rigid (plastic) screw cap; the screw cap oftentimes is integrated with a dispensing member such as a push-pull cap or a flip-top cap. The squeeze bottle is attractive due to its ease-of-use, ease of production, and low cost.

One shortcoming of the conventional squeeze bottle is its inability to provide conveniently a metered dose of liquid therefrom. Attempts to remedy this deficiency include rigid cap structures with dip tubes, pistons, or pump devices. These types of cap structures impart complexity, cost, weight and rigidity to the squeeze bottle—each a deleterious burden upon the simplistic ubiquity of today's squeeze bottle.

The art recognizes the need for a squeeze bottle with the ability to conveniently, accurately, and quickly dispense a metered dose of the fluid content contained therein.

SUMMARY

The present disclosure is directed to a dosing cap. In an embodiment, the dosing cap includes (A) a collar member. The collar member has an annular skirt depending from a base (B). An inner surface of the skirt has a securing member for securing the collar member to a neck of a container. The base (B) has (i) a top surface and a bottom surface, (ii) a valve seat is present on the top surface of the base. The valve seat has a center channel, and a radial channel, the channels extend through the base. The dosing cap includes (C) a plug member. The plug member is composed of a polymeric material. The plug member has the following components in inter-connected relationship: a head, a body, a leg, an ankle, and a flexible foot. The leg extends through the center channel, such that the head opposes the valve seat on the top surface of the base and the foot opposes the bottom surface of the base. The dosing cap further includes (D) a cap member having an annular sidewall extending from a dispensing element. An inner surface of the annular sidewall has an attachment member adjustably attached to a reciprocal attachment member on an outer surface of skirt. The dosing cap includes (E) a metering chamber. The metering chamber is formed by an enclosed volume between the cap member and the base. The dispensing element (F) permits flow of a fluid from the metering chamber.

The present disclosure provides another dosing cap. In an embodiment, a dosing cap is provided and includes (A) a collar member. The collar member has an annular skirt depending from a base (B). An inner surface of the skirt has a securing member for securing the collar member to a neck of a container. The base includes a well having a well-wall and a floor. An aperture is located on the well-wall. The dosing cap includes (C) a flap member composed of polymeric material. The flap member has a land, a wing and an elbow connecting the land to the wing. The land is attached to the floor. The wing extends along the well-wall, the flap member permitting fluid flow through the aperture. The dosing cap includes (D) a cap member having an annular sidewall extending from a dispensing element. An inner surface of the annular sidewall has an attachment member adjustably attached to a reciprocal attachment member on an outer surface of the skirt. The dosing cap includes (E) a metering chamber formed by an enclosed volume between the cap member and the base. The dosing cap includes (F) the dispensing element permitting flow of a fluid from the metering chamber.

BRIEF DESCRIPTION OF THE DRAWINGS

FIG. 1 is a perspective view of a dosing cap on a bottle, in accordance with an embodiment of the present disclosure.

FIG. 2C is a sectional view of the plug member in the closed position on the collar member taken along line 2C-2C of FIG. 2B.

FIG. 2D is a sectional view of the plug member in the closed position on the collar member taken along line 2C-2C of FIG. 2B, the plug member of FIG. 2D made from two different polymeric materials in accordance with an embodiment of the present disclosure.

FIG. 3 is a sectional view of the dosing cap on the bottle, taken along line 3-3 of FIG. 1.

FIG. 7A is an exploded perspective view of a collar member and a flap member, in accordance with an embodiment of the present disclosure.

FIG. 7B is a perspective view of the flap member in a closed position on the collar member, in accordance with an embodiment of the present disclosure.

FIG. 7C is a sectional view of the flap member in the closed position on the collar member taken along line 7C-7C of FIG. 7B.

FIG. 8 is a sectional view of the flap member embodiment of the dosing cap on the bottle, taken along line 3-3 of FIG. 1.

DEFINITIONS

Figure 2A:
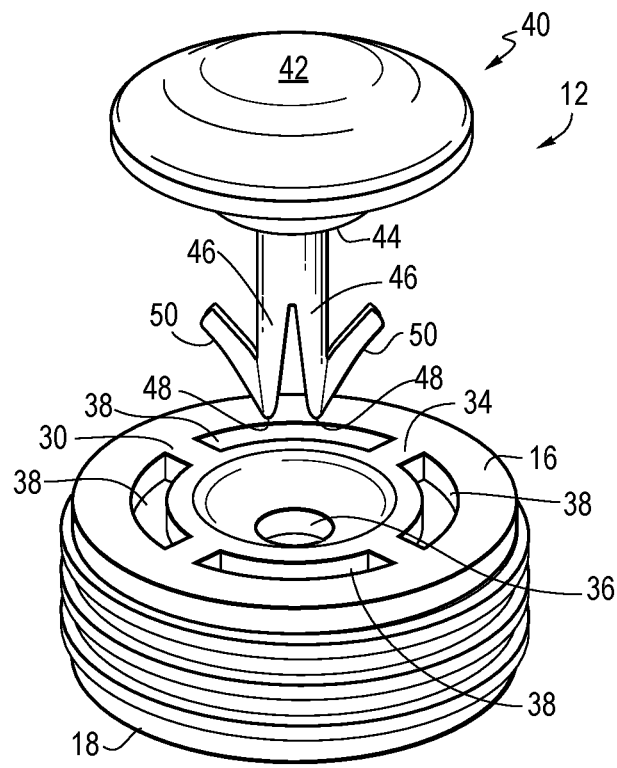
FIG. 2A is an exploded perspective view of a collar member and a plug member, in accordance with an embodiment of the present disclosure.
Figure 2B:
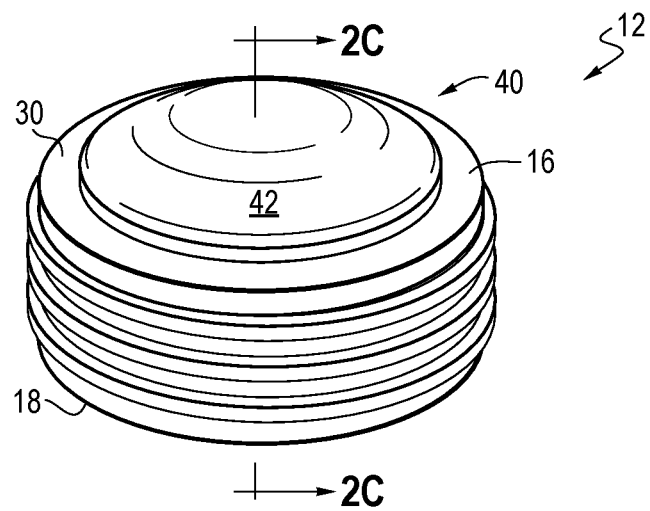
FIG. 2B is a perspective view of the plug member in a closed position on the collar member, in accordance with an embodiment of the present disclosure.
Figure 4A:
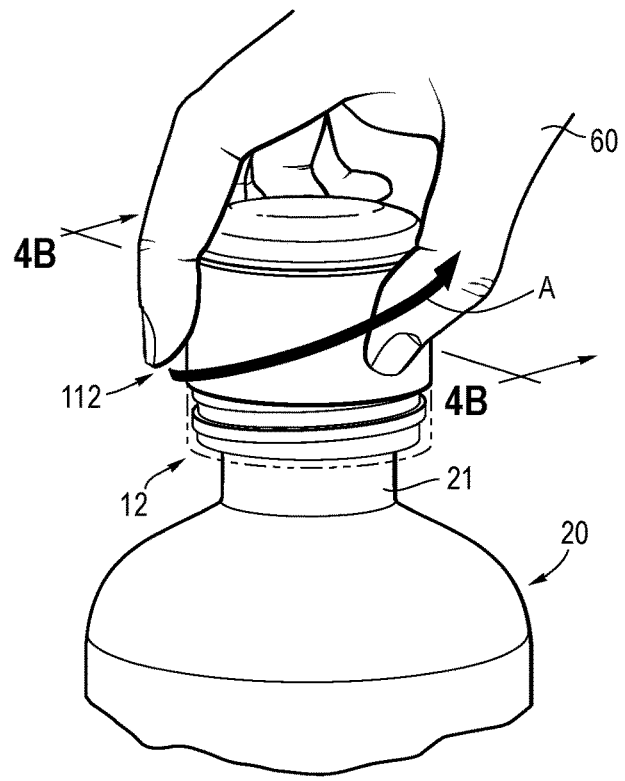
FIG. 4A is a perspective view of a person adjusting the volume of the metering chamber, in accordance with an embodiment of the present disclosure.
Figure 4B:
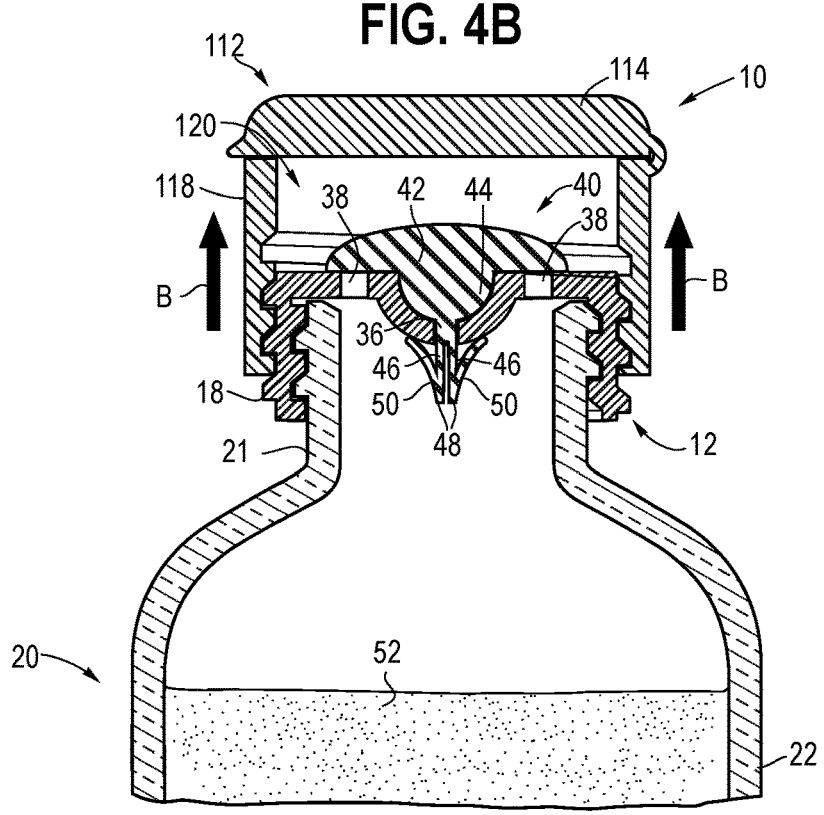
FIG. 4B is a sectional view of the dosing cap on the bottle taken along line 4B-4B of FIG. 4A.

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from *Borealis*, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetra polymers, etc.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from *Borealis*, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, such as described in patent references U.S. Pat. Nos. 6,111,023; 5,677,383; and 6,984,695. EPE resins have a density from 0.905 g/cc to 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains more than 50 weight percent polymerized olefin monomer (based on total amount of polymerizable monomers), and optionally, may contain at least one comonomer. A nonlimiting example of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. Nonlimiting examples of suitable propylene copolymer include propylene impact copolymer and propylene random copolymer.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

TEST METHODS

Density is measured in accordance with ASTM D792, Method B. The result is recorded in grams per cubic centimeter (g/cc).

Differential Scanning Calorimetry (DSC)

Differential Scanning calorimetry (DSC) can be used to measure the melting, crystallization, and glass transition behavior of a polymer over a wide range of temperature. For example, the TA Instruments $C_{11000}$ DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=(($H_f$)/292 J/g)×100.

The heat of fusion ($H_f$) (also known as melt enthalpy) and the peak melting temperature are reported from the second heat curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Melt index (MI) (I2) in g/10 min is measured using ASTM D1238 (190° C./2.16 kg).

Melt flow rate (MFR) in g/10 min is measured using ASTM D1238 (230° C./2.16 kg).

DETAILED DESCRIPTION

The present disclosure is directed to a dosing cap. In an embodiment, the dosing cap includes (A) a collar member. The collar member has an annular skirt depending from a base (B). An inner surface of the skirt has a securing member for securing the collar member to a neck of a container. The base (B) has (i) a top surface and a bottom surface, (ii) a valve seat is present on the top surface of the base. The valve seat has a center channel, and a radial channel, the channels extend through the base. The dosing cap includes (C) a plug member. The plug member is composed of a polymeric material. The plug member has the following components in inter-connected relationship: a head, a body, a leg, an ankle, and a flexible foot. The leg extends through the center channel, such that the head opposes the valve seat on the top surface of the base and the foot opposes the bottom surface of the base. The dosing cap further includes (D) a cap member having an annular sidewall extending from a dispensing element. An inner surface of the annular sidewall has an attachment member adjustably attached to a reciprocal attachment member on an outer surface of skirt. The dosing cap includes (E) a metering chamber. The metering chamber is formed by an enclosed volume between the cap member and the base. The dispensing element (F) permits flow of a fluid from the metering chamber.

FIGS. 1, 2A, 2B, and 3 show a dosing cap 10. Dosing cap 10 includes a collar member 12, and a cap member 112. The collar member 12 has a base 16. An annular skirt 18 depends from, or otherwise extends from, the base 16. The annular skirt 18 has an inner circumferential inner surface. Located on an inner surface of the skirt 18 is a securing member. The securing member secures the collar member (and thereby the dosing cap 10) to a neck of a container. Nonlimiting examples of suitable securing members include a snap structure and threads.

The collar member 12 and the cap member 112 each is composed of a polymeric material. Nonlimiting examples of suitable polymeric material for collar member 12 include olefin-based polymer, propylene-based polymer, and ethylene-based polymer, and combinations thereof. Collar member 12 is an integral component whereby base 16 and skirt 18 are composed of the same polymeric material.

The container upon which the dosing cap is attached may be flexible or rigid. In an embodiment, the container is flexible and is a squeeze bottle 20 as shown in FIGS. 1-12. A "squeeze bottle," as used herein, is a container with a dispensing outlet that is made of polymeric material for dispensing liquid; the sidewall of the squeeze bottle is flexible. Activation of the squeeze bottle is accomplished by applying a squeezing force onto the sidewall—typically by exerting pressure with a user's hand. The manual pressure applied to the flexible sidewall compresses the air and liquid within the bottle interior, thereby discharging the liquid contents in the squeeze bottle through the dispensing outlet.

Squeeze bottle 20 includes a neck 21 and a body 22. The body 22 may or may not include additional structure, design, and/or contour features. In an embodiment, the body 22 includes circumferential ribs 23, as shown in FIG. 1.

Attachment between the collar member 12 and the neck 21 may be (i) releasable or (ii) permanent. In an embodiment, attachment between the collar member 12 and the neck 21 is releasable and the securing member located on the annular skirt 18 includes internal threads 24. The internal threads 24 operatively mate, and interlock, with external threads 26 located on the exterior surface of neck 21 as shown in FIGS. 2C and 3. The interlocking threads 24, 26 provide releasable attachment between the collar member 12 and the neck 21. Consequently, an advantage of the present dosing cap 10 is the ability to attach the dosing cap to any incumbent container (and any incumbent squeeze bottles in particular) having a threaded neck.

As shown in FIG. 3, the cap member 112 includes a dispensing element 114 and an annular sidewall 118 extending from the dispensing element 114. Suitable structure on the inner surface of the annular sidewall 118 and structure on the outer surface of the skirt 18 enables adjustable attachment between the cap member 112 and the collar member 12. The term "adjustable attachment," as used herein, is securement between the collar member and the cap member wherein the cap member is moveable with respect to the collar member, the cap member remaining secured, or otherwise attached, to the collar member. Nonlimiting examples of adjustable attachment mechanisms include telescopic (sliding) attachment and threaded (twist or screw) attachment, friction fit attachment, luer-lock attachment, snap-fit attachment, and combinations thereof.

In an embodiment, the adjustable attachment is accomplished by way of threaded attachment. As shown in FIG. 3, the cap member 112 includes internal threads 124 which operatively mate, and interlock, with external threads 126 on the outer surface of the annular skirt 18. The interlocking threads 124, 126 provide adjustable securement between the cap member 112 and the collar member 12. The annular skirt 18 includes a locking member 128. The locking member 128 prevents the cap member 112 from being completely unscrewed, or otherwise completely unthreaded, from the collar 12.

Adjustable attachment of the cap member 112 to the collar member 12 forms a metering chamber 120. The metering chamber 120 is an enclosed volume between the cap member 112 and the base 16. The metering chamber 120 has a predetermined minimum volume and a predetermined maximum volume. Adjusting (sliding, twisting, screwing, or otherwise rotating) the position of the cap member 112 upon the collar member 12 correspondingly adjusts the volume of the metering chamber between the minimum volume and the maximum volume. The cap member 112 is movable with respect to the collar member 12 and advantageously permits a user to set a predetermined dose amount between the minimum volume and the maximum volume of the metering chamber.

FIGS. 2A, 2B, 2C, and 2D show the collar member 12. The collar member 12 includes base 16. The base 16 has a top surface 30 and a bottom surface 32. A valve seat 34 is present on the top surface 30. The valve seat 34 has a center channel 36 and a radial channel 38. Although FIG. 2A shows four radial channels 38, it is understood the valve seat 34 may have from one, or two, or three to four or five, or six, or more radial channels. In an embodiment, the valve seat 34 includes four radial channels 38 as shown in FIG. 2A. The channels 36, 38 extend through the base 16. In other words, the center channel 36 and the radial channels 38 each extend from the top surface 30 of the base 16 to the bottom surface 32 of the base 16. In an embodiment, the collar member 12 is composed of HDPE.

The present dosing cap includes a plug member 40 as shown FIGS. 2A-2D. The plug member 40 is composed of rubber and/or one or more polymeric materials. Nonlimiting examples of suitable rubber include natural rubber, synthetic rubber, silicone rubber, silicones, and combinations thereof. Nonlimiting examples of suitable polymeric material for the plug member include olefin-based polymer, propylene-based polymer, ethylene-based polymer, and combinations thereof.

The plug member 40 has the following components, the components in inter-connected relationship to each other: a head 42, a body 44, a leg 46, an ankle 48, and a flexible foot 50. The term "inter-connected relationship," as used herein, refers to the direct (i.e., no intervening structure) attachment between adjacent components of the plug member 40. In other words, head 42 is directly attached to (or directly connected to) body 44, body 44 is directly attached to (or directly connected to) leg 46, leg 46 is directly attached to (or directly connected to) to ankle 48, and ankle 48 is directly attached to (or directly connected to) flexible foot 50.

In an embodiment, the plug member 40 is composed of a polymeric material that is an elastomeric material. Nonlimiting examples of suitable elastomeric materials include silicones, polyolefin elastomers, plastomers/elastomers, ethylene/α-olefin multi-block copolymer, ethylene-propylene-diene terpolymer (EPDM), and combinations thereof.

In an embodiment, the elastomeric material for the plug member 40 is an ethylene/α-olefin multi-block copolymer. The term "ethylene/α-olefin multi-block copolymer" refers to an ethylene/$C_4$-$C_8$ α-olefin multi-block copolymer consisting of ethylene and one copolymerizable $C_4$-$C_8$ α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The $C_4$-$C_8$ α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains from 50 wt %, or 60 wt %, or 65 wt % to 80 wt %, or 85 wt %, or 90 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

Nonlimiting examples of suitable ethylene/α-olefin multi-block copolymer are disclosed in U.S. Pat. No. 7,608,668, the entire content of which is incorporated by reference herein.

In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2,$$

where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 122° C., or 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties: (i) a Mw/Mn from 1.7, or 1.8 to 2.2, or 2.5, or 3.5; and/or (ii) a density from 0.850 g/cc, or 0.860 g/cc, or 0.865 g/cc, or 0.870 g/cc to 0.877 g/cc, or 0.880 g/cc, or 0.900 g/cc; and/or (iii) a melting point, Tm, from 115° C., or 118° C., or 119° C., or 120° C. to 121° C., or 122° C., or 125° C.; and/or (iv) a melt index (MI) from 0.1 g/10 min, or 0.5 g/10 min to 1.0 g/10 min, or 2.0 g/10 min, or 5 g/10 min, or 10 g/10 min, or 50 g/10 min; and/or (v) 50-85 wt % soft segment and 40-15 wt % hard segment; and/or (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (viii) an elastic recovery (Re) from 50%, or 60% to 70%, or 80%, or 90%, at 300% $min^{-1}$ deformation rate at 21° C. as measured in accordance with ASTM D1708; and/or (ix) a polydisperse distribution of blocks and a polydisperse distribution of block sizes.

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Mich., USA.

In an embodiment, the plug member 40 is a single integrally formed piece composed of a single polymeric material wherein head 42, body 44, leg 46, ankle 48, and flexible foot 50 form a unitary piece (formed in a one-shot molding procedure) as shown in FIG. 2C. In a further embodiment, the polymeric material for the single integrally formed piece plug member 40 is an ethylene/α-olefin multi-block copolymer.

In an embodiment, the plug member 40 is a piece composed of two polymeric materials wherein head 42 and outer body 44a are composed of a first polymeric material and inner body 44b, leg 46, ankle 48, and flexible foot 50 are composed of a second polymeric material. Head 42/outer body 44a is molded onto inner body 44b (or inner body 44b is molded onto head 42/outer body 44a) in a two-shot molding procedure (or two-shot overmolding procedure) to form two-component plug member 41 as shown in FIG. 2D.

Alternatively, head 42/outer body 44a can be attached to inner body 44b by way of an adhesive material.

The structure of the leg can be varied. In an embodiment, the leg is a single leg structure, the single leg being a cylindrical structure (either solid or annular), with the single leg having a corresponding single ankle/single foot extending radially from the cylindrical leg structure. FIGS. 2C, 2D, 3, 4B, 5A-B, 6A-B show an alternate embodiment of the leg structure, wherein the leg structure includes two legs 46, with each leg having a respective ankle 48 and a respective flexible foot 50. Description of the two-leg structure will now be provided, with description of the two-leg structure applying equally to the one leg structure.

Legs 46 extend through the center channel 36, such that the head 42 opposes valve seat 34 and each foot 50 opposes the bottom surface 32 of the base 16. The ankles 48 are constructed such that each foot 50 is oriented to contact the bottom surface 32 of the base 16. In an embodiment, ankles 48 and feet 50 are constructed so that each foot 50 is oriented to be in constant contact, or otherwise in continuous contact, with the bottom surface 32 of the base 16.

The plug member 40 is normally in a closed position as shown in FIGS. 2C-D and FIG. 3. In the "closed position," the configuration and the angle of the ankle 48 positions the flexible foot 50 to bias against the bottom surface 32. In other words, the flexible foot 50 imparts a constant biasing force upon the bottom surface 32 of the base 16. The constant biasing force is hereafter interchangeably referred to as the "closed biasing force." With the interconnected relationship between the feet 50 and the head 42, the closed biasing force imparted by the feet 50 upon the bottom surface 32 forces, or otherwise maintains, (i) head 42 to cover and seal radial channel 38 and the closed biasing force also (ii) forces, or otherwise maintains, body 44 to cover and seal the center channel 36. Thus, in the closed position, the plug member 40—vis-à-vis the closed biasing force—blocks, or otherwise prevents, fluid content from passing between the body 22 and metering chamber 120.

It is understood that plug member 40 is in the closed position when squeeze bottle 20 is in an upright position or when the squeeze bottle 20 is in an inverted position and no excess pressure is applied to the flexible bottle.

FIGS. 4A-6C show operation of the present dosing cap 10. A person (hand 60, FIG. 4A) sets the desired metered dose amount of liquid to be dispensed by the dosing cap 10 by rotating the cap member 112 about the collar member 12, as shown by arrow A in FIG. 4A. The rotation of the cap member 112 (arrow A in FIG. 4A), raises the cap member 112 (shown by arrow B in FIG. 4B) above the collar member 12 to set a pre-determined volume for the metering chamber 120, and correspondingly a pre-determined or metered dose to be dispensed from the dosing cap 10.

Figure 5A:
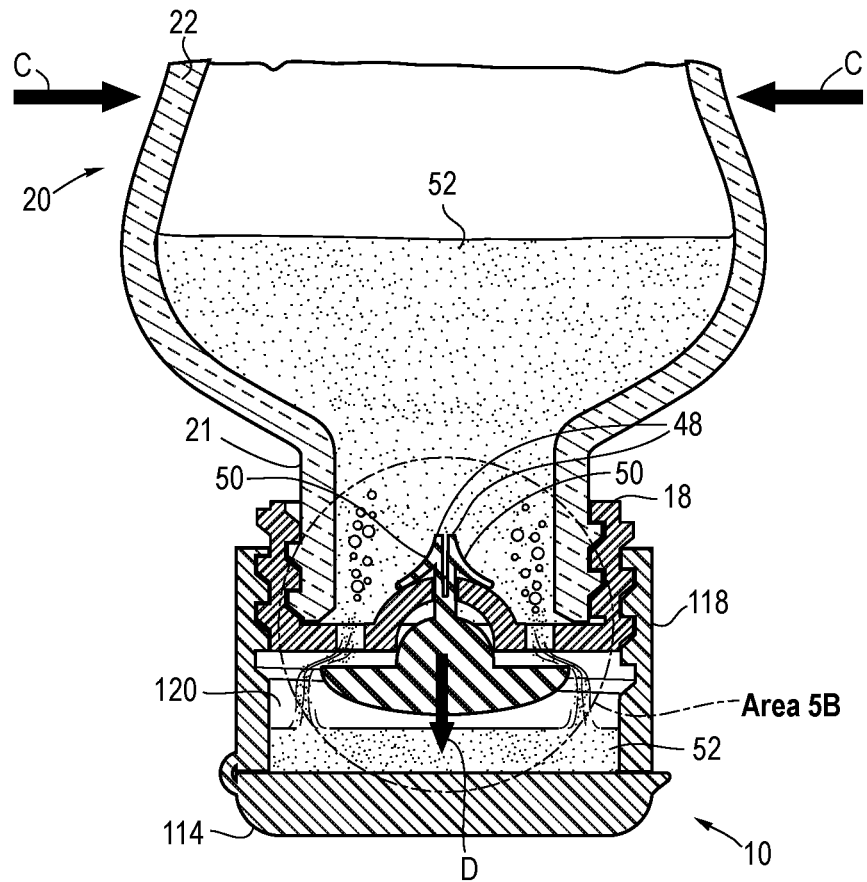
FIG. 5A is a sectional view of the bottle and dosing cap in an inverted position and the plug member in an open position for the filling of the metering chamber, in accordance with an embodiment of the present disclosure.
Figure 5B:
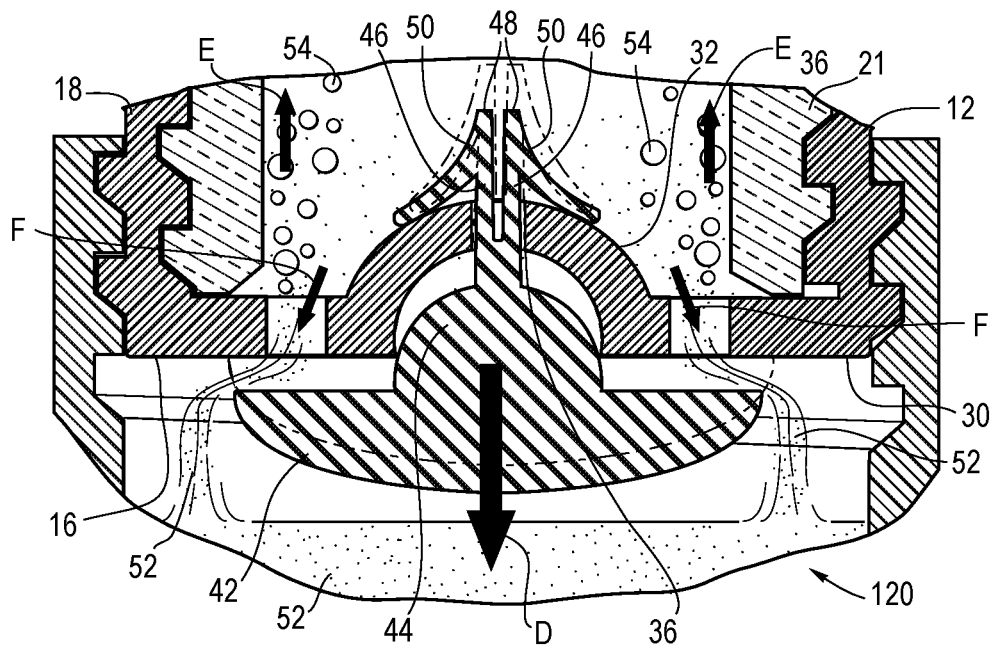
FIG. 5B is an enlarged view of area 5B of FIG. 5A.

The squeeze bottle 20 (with dosing cap 10 thereon) is inverted and the user squeezes the body 22 as shown by opposing arrows C in FIG. 5A. As shown in FIG. 5B, when pressure on the inside of the collar member 12 (vis-à-vis a squeezing force applied to the flexible container body) is greater than the pressure on the outside of the collar member 12 by an amount sufficient to overcome the closed biasing force which holds the plug member 40 closed, the plug member 40 moves from the closed position to an open position. In the "open position," the squeezing force exceeds the closed biasing force, the squeezing force deforming ankles 48 (increasing the size of the ankle angle) and further deforming and extending the contact each foot 50 has upon the bottom surface 32 of the base 16. In the open position (i) head 42 separates from the radial channel 38, (ii) body 44 separates from center channel 36 as shown by arrow D; thereby (iii) allowing air (air bubbles 54) from the metering chamber to pass into the body 22 (as shown by arrows E in FIGS. 5A, 5B) and (iv) permitting flow of fluid content from within body 22 through the channels 36, 38 and into the metering chamber 120 (as shown by arrows F in FIG. 5B).

Figure 6A:
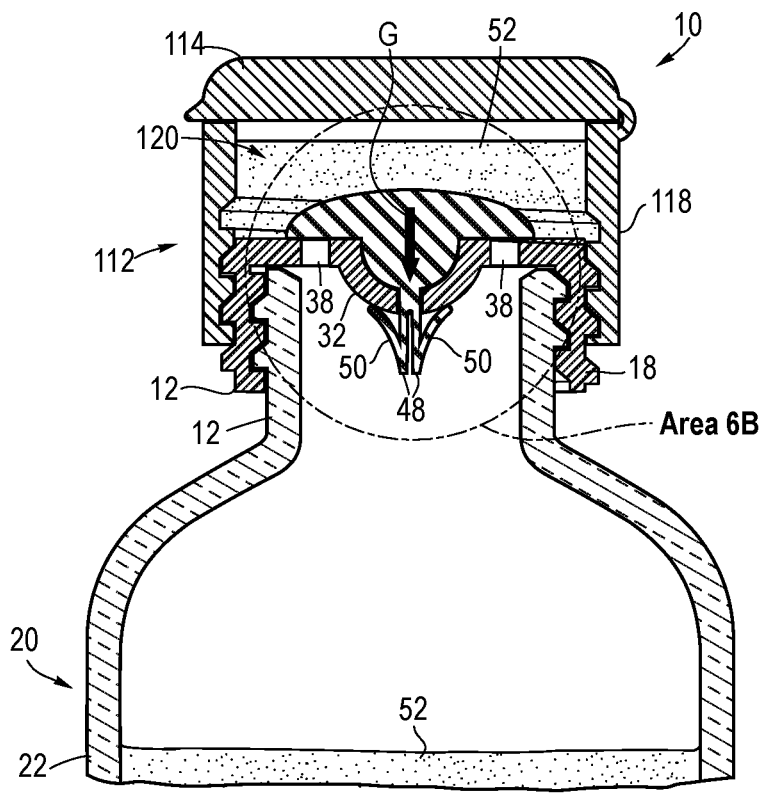
FIG. 6A is a sectional view of the bottle and dosing cap in an upright position and the metering chamber filled with liquid, in accordance with an embodiment of the present disclosure.
Figure 6B:
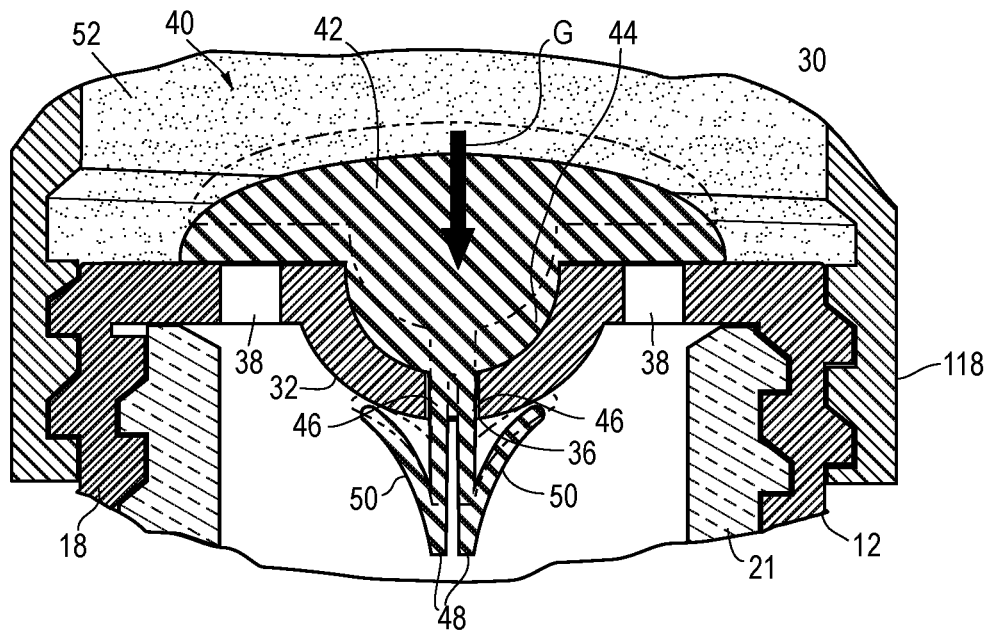
FIG. 6B is an enlarged view of area 6B of FIG. 6A.
Figure 9A:
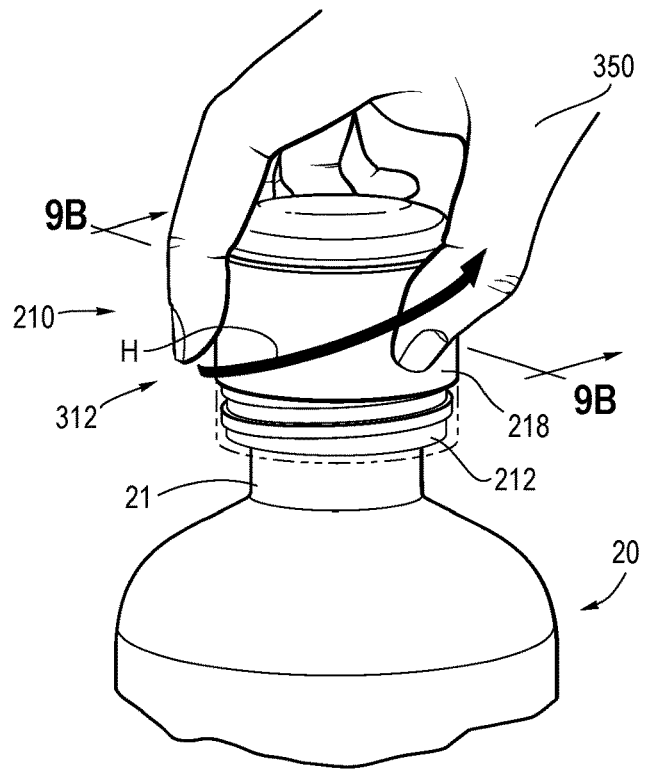
FIG. 9A is a perspective view of a person adjusting the volume of the metering chamber, in accordance with an embodiment of the present disclosure.
Figure 9B:
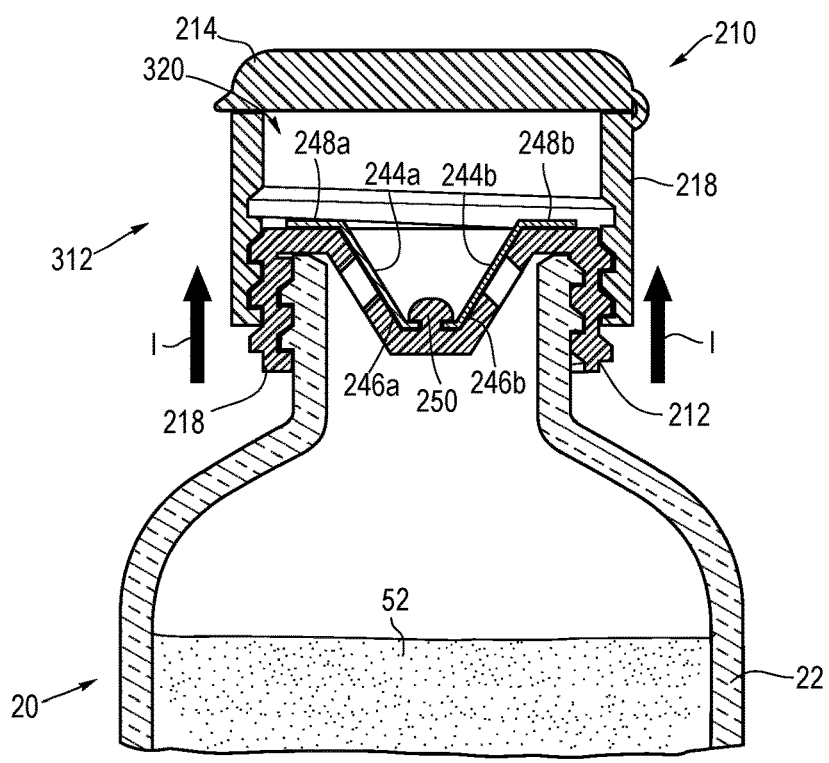
FIG. 9B is a sectional view of the dosing cap on the bottle taken along line 9B-9B of FIG. 9A.

The bottle 20 (with dosing cap 10) is returned to the upright position, as shown in FIGS. 6A and 6B. With the squeezing force removed from the body 22, the closed biasing force returns plug member 40 to the closed position.

In the closed position, the head 42 and the body 44 prevent backflow of the liquid 52 now residing in the metering chamber 120. FIG. 6B shows the closed biased biasing force returning the plug member 40 to the closed position preventing liquid 52 from moving back, or otherwise "backflowing," into the squeeze bottle 20. In the closed position (non-squeezed state), head 42 blocks radial channel 38 and body 44 blocks center channel 36, forming a watertight seal and preventing backflow.

FIG. 6B shows an embodiment wherein the valve seat is configured as a cup. The cup defines a void space having a shape. The center channel 36 extends through the base 16 from the bottom of the cup. The body 44 has a shape that is reciprocal to the void space of the cup.

The present disclosure provides another dosing cap. In an embodiment, a dosing cap is provided and includes (A) a collar member. The collar member has an annular skirt depending from a base (B). An inner surface of the skirt has a securing member for securing the collar member to a neck of a container. The base includes a well having a well-wall and a floor. An aperture is located on the well-wall. The dosing cap includes (C) a flap member composed of polymeric material. The flap member has a land, a wing and an elbow connecting the land to the wing. The land is attached to the floor. The wing extends along the well-wall, the flap member permitting fluid flow through the aperture. The dosing cap includes (D) a cap member having an annular sidewall extending from a dispensing element. An inner surface of the annular sidewall has an attachment member adjustably attached to a reciprocal attachment member on an outer surface of the skirt. The dosing cap includes (E) a metering chamber formed by an enclosed volume between the cap member and the base. The dosing cap includes (F) the dispensing element permitting flow of a fluid from the metering chamber.

FIG. 1 shows dosing cap 210. Dosing cap 10 and dosing cap 210 are the same, or substantially the same, when viewed from the exterior. In other words, the following components can be the same, or substantially the same, between dosing cap 210 and dosing cap 10 with the component for dosing cap 10 shown in parentheses; cap member 312 (112), dispensing element 314 (114), and annular sidewall 318 (118). Dosing cap 10 and dosing cap 210 differ in the structure to the collar member as will be discussed in detail below.

FIG. 7 shows dosing cap 210 includes a collar member 212. The collar member 212 has a base 216. An annular skirt 218 depends from, or otherwise extends from, the base 216. The annular skirt 218 has an inner circumferential inner surface. Located on an inner surface of the skirt 218 is a securing member. The securing member secures the collar member 212 (and thereby the dosing cap 210) to a neck of a container. Nonlimiting examples of suitable securing members include a snap structure and threads.

The collar member 212 is composed of a polymeric material. Nonlimiting examples of suitable polymeric material for collar member 212 include olefin-based polymer, propylene-based polymer, and ethylene-based polymer. Collar member 212 is an integral component whereby base 216 and skirt 218 are composed of the same polymeric material.

The container upon which the dosing cap 210 is attached may be flexible or rigid. In an embodiment, the container is flexible and is squeeze bottle 20 as shown in FIGS. 8-12.

Squeeze bottle 20 includes a neck 21 and a body 22. The body 22 may or may not include additional structure, design, and/or contour features. In an embodiment, the body 22 includes circumferential ribs 23, as shown in FIG. 1.

Attachment between the collar member 212 and the neck 21 may be (i) releasable or (ii) permanent. In an embodiment, attachment between the collar member 212 and the neck 21 is releasable and the securing member located on the annular skirt 218 includes internal threads 224. The internal threads 224 operatively mate, and interlock, with external threads 226 located on the exterior surface of neck 21. The interlocking threads 224, 226 provide releasable attachment between the collar member 212 and the neck 21. Consequently, an advantage of the present dosing cap 10 is the ability to attach the dosing cap to any incumbent container (and any incumbent squeeze bottles in particular) having a threaded neck.

As shown in FIG. 8, the cap member 312 includes a dispensing element 314 and an annular sidewall 318 extending from the dispensing element 314. Suitable structure on the inner surface of the annular sidewall 318 and structure on the outer surface of the skirt 218 enables adjustable attachment between the cap member 112 and the collar member 212. The term "adjustable attachment," as used herein, is securement between the collar member and the cap member wherein the cap member is moveable with respect to the collar member, the cap member remaining secured, or otherwise attached, to the collar member. Nonlimiting examples of adjustable attachment mechanisms include telescopic (sliding) attachment and threaded (twist or screw) attachment, friction fit attachment, luer-lock attachment, snap-fit attachment, and combinations thereof.

In an embodiment, the adjustable attachment is accomplished by way of threaded attachment. As shown in FIG. 8, the cap member 312 includes internal threads 324 which operatively mate, and interlock, with external threads 326 on the outer surface of the annular skirt 218. The interlocking threads 324, 326 provide adjustable securement between the cap member 312 and the collar member 212. The annular skirt 218 includes a locking member 328. The locking member 228 prevents the cap member 312 from being completely unscrewed, or otherwise completely unthreaded, from the collar 212.

Adjustable attachment of the cap member 312 to the collar member 212 forms a metering chamber 320. The metering chamber 320 is an enclosed volume between the cap member 312 and the base 216. The metering chamber 320 has a predetermined minimum volume and a predetermined maximum volume. Adjusting (sliding, twisting, screwing, or otherwise rotating) the position of the cap member 312 upon the collar member 212 correspondingly adjusts the volume of the metering chamber between the minimum volume and the maximum volume. The cap member 312 is movable with respect to the collar member 212 and advantageously permits a user to set a predetermined dose amount between the minimum volume and the maximum volume of the metering chamber.

FIGS. 7A, 7B, and 7C show the collar member 212. The collar member 212 includes base 216. The base 216 includes a well 230. Well 230 has a well-wall 232 and a floor 234. Well can have a single well-wall. Alternatively, well 230 can have a plurality of well-walls. Well 230 can have from one, or two or three to four or five, or six, or more well-walls.

In an embodiment, well 230 has four well-walls, 232a, 232b, 232c, and 232d. The four well-walls 232a-232d and the floor 234 define a void space 236. Void space 236 has an inverted frusto-pyramidal shape as best seen in FIG. 7C.

An aperture is present on one, some, or all of the well-walls 232a-232d. In an embodiment, opposing well-walls each has an aperture. FIGS. 7A, 7C and 8 show apertures 238a, 238c located on respective opposing well-walls 232a and 232b.

Dosing cap 210 includes a flap member 240. Flap member 240 is composed of a polymeric material. The polymeric material can be any rubber, silicone, or polymeric material as previously disclosed herein. Nonlimiting examples of suitable polymeric material include olefin-based polymer, propylene-based polymer, ethylene-based polymer, and combinations thereof.

In an embodiment the flap member 240 is composed of a rubber, a silicone, an ethylene/α-olefin multi-block copolymer, and combinations thereof.

In an embodiment, the flap member is composed of ethylene/α-olefin multi-block copolymer.

Flap member 240 has a land 242, opposing wings 244a, 244b and respective elbows 246a, 246b connecting land 242 to wings 244a, 244b. Respective tips 248a, 248b extend from wings 244a, 244b. Flap member 240 is attached to floor 234 by way of a pin 250. Although FIG. 7A-7C show two wings 244a, 244b, it is understood flap member 240 may have from one, or two, or three to four or five, or six, or more wings—flap member having the same number of wings corresponding to the respective number of apertures.

The flap member 240 is configured, or is otherwise formed, so to flex, or otherwise bend, at elbows 246a, 246b. As seen in FIGS. 7A-7C, land 242 is coextensive with floor 234, wing 244a is coextensive with well-wall 232a and wing 244b is coextensive with well-wall 232b. Each elbow 246a, 246b is reciprocally aligned with the respective seam between the well-wall and floor. Each tip 248a, 248b is formed at an angle to respective wing 244a, 244b such that tip contacts, or otherwise snugly lies upon the top surface of base 216.

In an embodiment, the flap member 240 is an integral component and is composed of a single polymeric material. In other words, land 242, wings 244a, 244b, elbows 246a, 246b, tips 248a, 248b form a unitary component, namely flap member 240, the unitary component flap member 240 composed of a single rubber, a single silicone, or a single polymeric material. In an embodiment, the polymeric material is a single elastomeric material. In a further embodiment, the single elastomeric material is an ethylene/α-olefin multi-block copolymer.

The flap member 240 is normally in a closed position as shown in FIGS. 7C and 8. In the "closed position," the elasticity and the angle formed by elbow 246a, 246b between land 242 and wings 244a, 244b positions, or otherwise orients, wings 248a, 248b to bias against respective well-walls 232a, 232b. In other words, wings 248a, 248b of flap member 240 impart a constant biasing force upon respective well-walls 232a, 232b, thereby sealing respective apertures 238a, 238b. The constant biasing force is hereafter interchangeably referred to as the "closed biasing force." Thus, in the closed position, the wings of flap member 240—vis-à-vis the closed biasing force—block, or otherwise prevent, fluid content from passing between the body 22 and metering chamber 320.

It is understood that flap member 240 is in the closed position when squeeze bottle 20 is in an upright position or in an inverted position and no excess pressure applied to the flexible bottle.

FIGS. 9A-11 show operation of the present dosing cap 210. A person (hand 350, FIG. 9A) sets the desired metered dose amount of liquid to be dispensed by the dosing cap 210 by rotating the cap member 312 about the collar member 212, as shown by arrow H in FIG. 9A. The rotation of the cap member 312 (arrow H in FIG. 9A), raises the cap member 312 (shown by arrow I in FIG. 9B) above the collar member 212 to set a pre-determined volume for the metering chamber 320, and correspondingly a pre-determined or metered dose to be dispensed from the dosing cap 210.

Figure 10A:
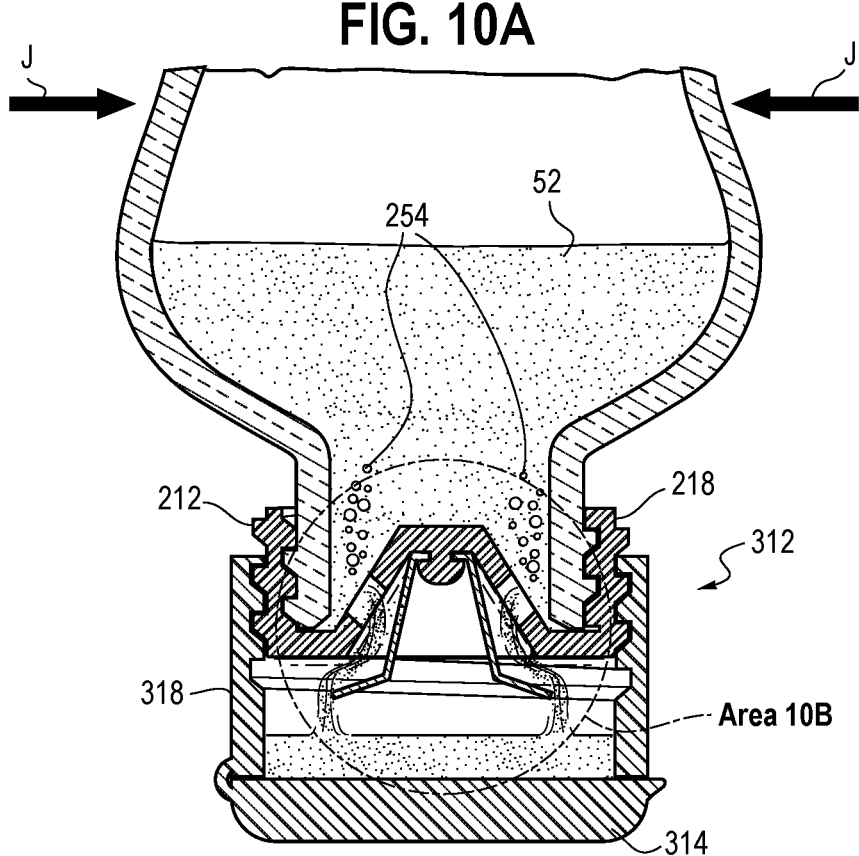
FIG. 10A is a sectional view of the bottle and dosing cap in an inverted position and the flap member in an open position for the filling of the metering chamber, in accordance with an embodiment of the present disclosure.

The squeeze bottle 20 (with dosing cap 10 thereon) is inverted and the user squeezes the body 22 as shown by opposing arrows J in FIG. 10A.

Figure 10B:
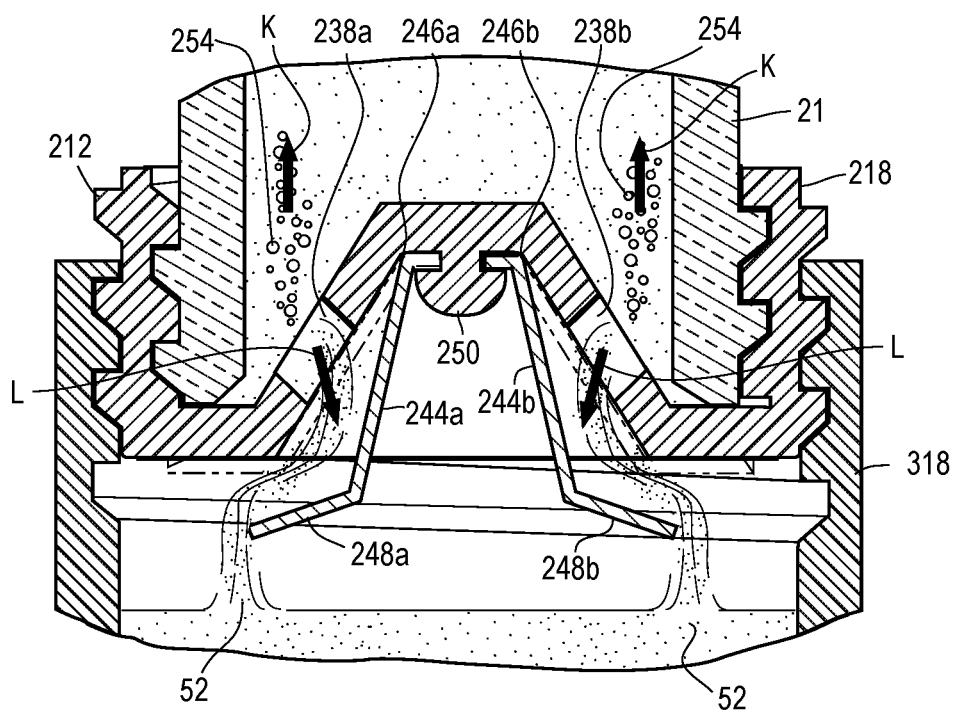
FIG. 10B is an enlarged view of area 10B of FIG. 10A.

As shown in FIG. 10B, when pressure on the inside of the collar member 212 (vis-à-vis a squeezing force applied to the flexible container body) is greater than the pressure on the outside of the collar member 212 by an amount sufficient to overcome the closed biasing force which holds the flap member 240 closed, the flap member moves from the closed position to an open position. In the "open position," the squeezing force exceeds the closed biasing force, the squeezing force flexing, or otherwise bending, wings 244a, 244b at respective elbows 246a, 246b away from respective sidewalls 232a, 232b. In the open position (i) wings 244a, 244b are separated from respective apertures 238a, 238b; thereby (ii) allowing air (air bubbles 254) from the metering chamber to pass into the body 22 as shown by arrows K (FIG. 10B) and (iii) permitting flow of fluid content from within body 22 through apertures 238a, 238b and into the metering chamber 320 as shown by arrows L (FIG. 10B).

Figure 11A:
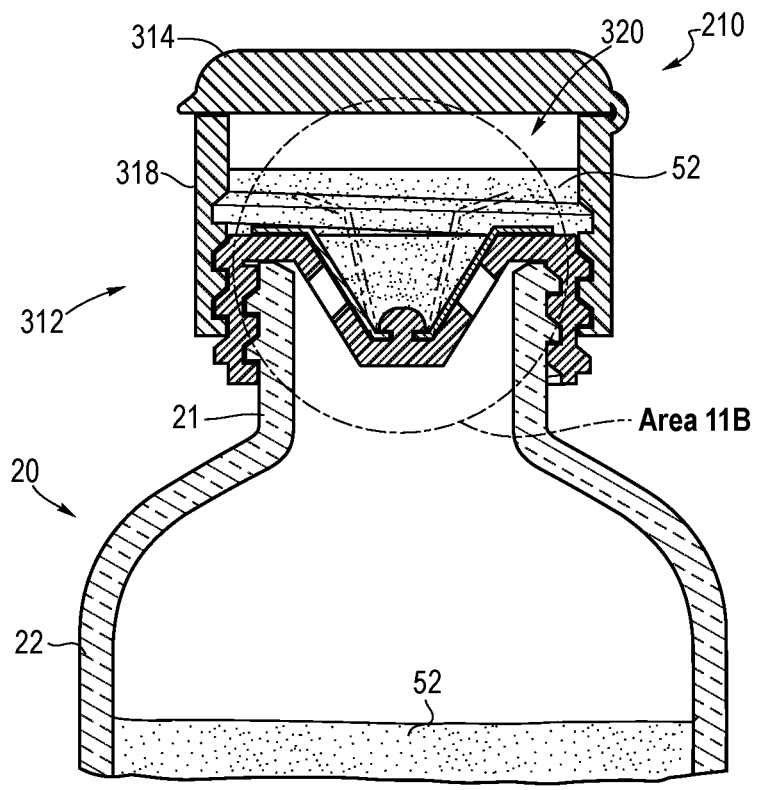
FIG. 11A is a sectional view of the bottle and dosing cap in an upright position and the metering chamber filled with liquid, in accordance with an embodiment of the present disclosure.
Figure 11B:
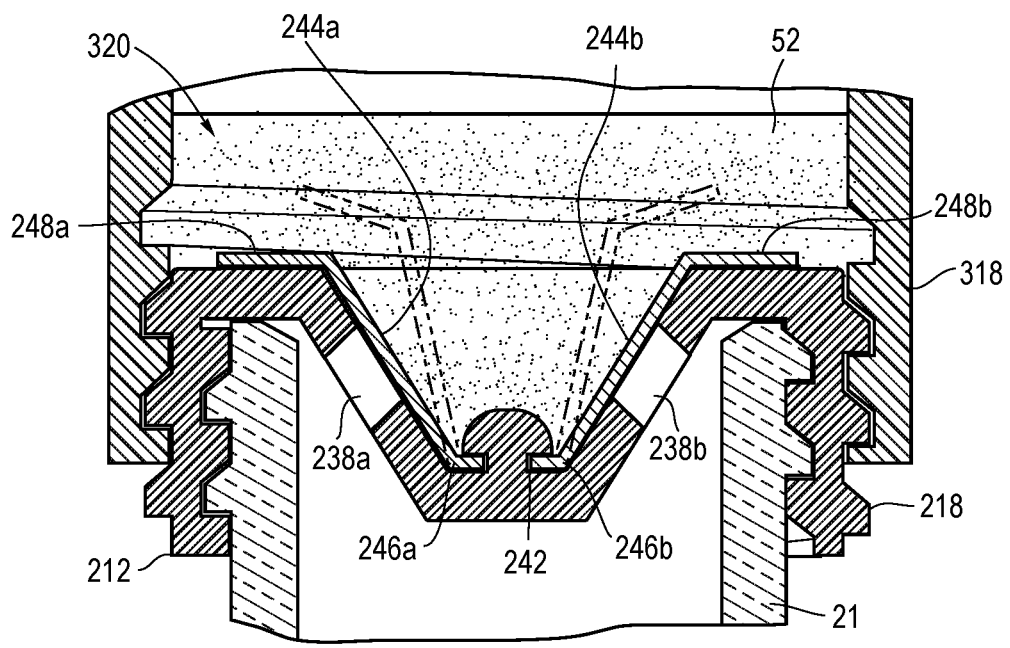
FIG. 11B is an enlarged view of area 11B of FIG. 11A.

The bottle 20 (with dosing cap 210) is returned to the upright position, as shown in FIGS. 11A and 11B. With the squeezing force removed from the body 22, the closed biasing force returns, thereby returning the flap member 240 to the closed position.

In the closed position, the wings 244a, 244b and tips 248a, 248b prevent backflow of the liquid 52 now residing in the metering chamber 320. FIG. 11B shows the closed biasing force returning the flap member 240 to the closed position preventing liquid 52 from moving back, or otherwise "backflowing," into the squeeze bottle 20. In the closed position (non-squeezed state), wing 244a-tip 248a and wing 244b-tip 248b block respective apertures 232a, 232b, forming a water-tight seal and preventing backflow.

Figure 12:
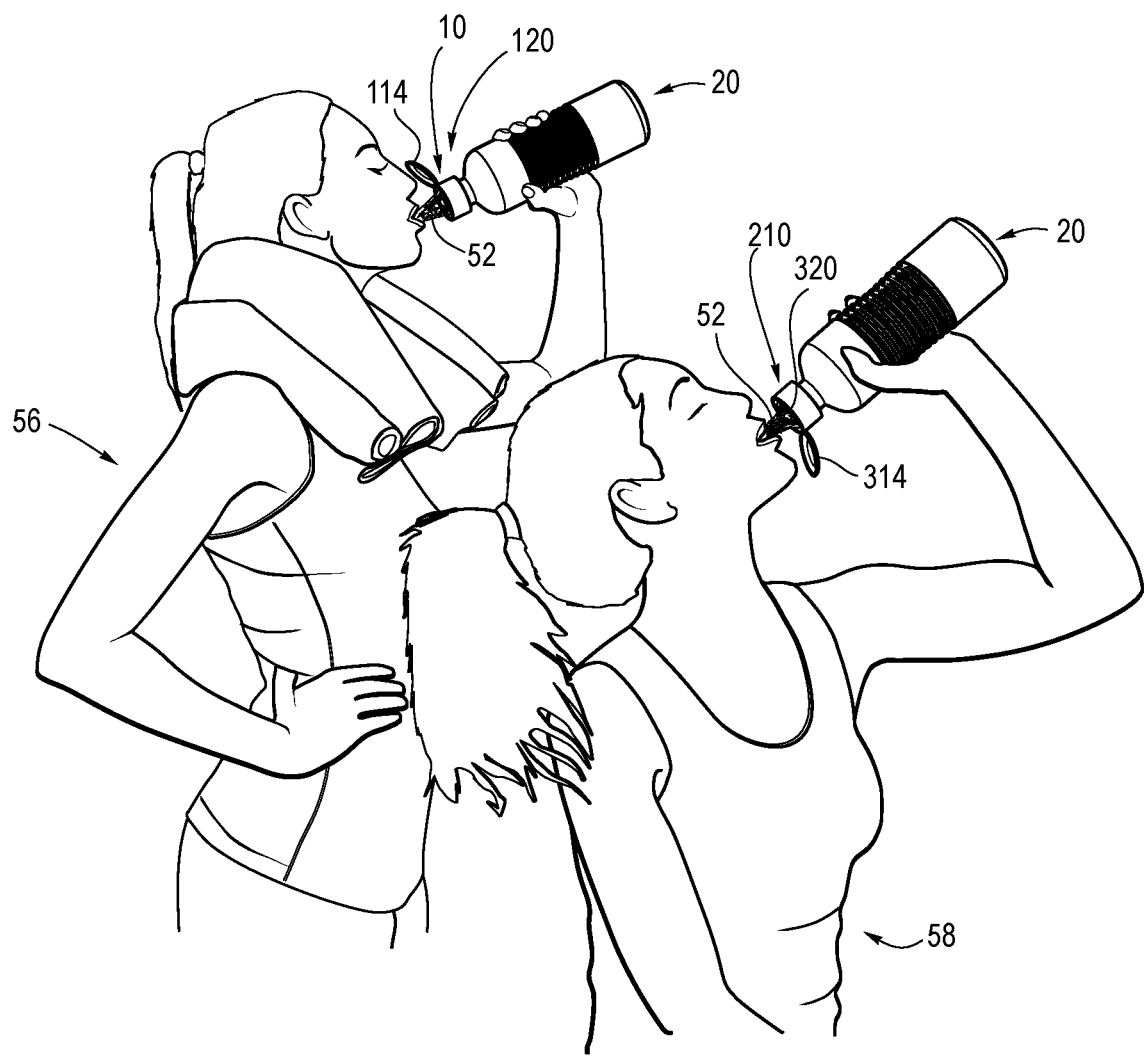
FIG. 12 is a perspective view of persons receiving a metered amount of liquid from respective bottle and dosing caps, in accordance with embodiments of the present disclosure.

In FIG. 12, a user, woman 56, opens the dispensing element 114 and receives the metered dose amount of liquid 52 from the metering chamber 120 of dosing cap 10. A user, woman 58, opens the dispensing element 314 and receives the metered dose amount of liquid 52 from the metering chamber 320 of dosing cap 210. Nonlimiting examples of suitable structures for the dispensing element include push-and-pull cap and flip-top cap. In an embodiment, the dispensing element 114, 314 each is a flip-top cap as shown in FIG. 12.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:
1. A dosing cap comprising:
(A) a collar member having an annular skirt depending from a base, an inner surface of the annular skirt having a securing member for securing the collar member to a neck of a flexible container;
(B) the base having
  (i) a top surface and a bottom surface,
  (ii) a valve seat on the top surface, the valve seat having a center channel, and a radial channel, the channels extending through the base;

(C) a plug member composed of a polymeric material, the plug member having the following components in inter-connected relationship a head, a body, a leg, an ankle, and a foot;

the leg extends through the center channel, such that the head opposes the valve seat on the top surface and the foot opposes the bottom surface of the base, the plug member permitting fluid flow through the channels, the plug member has a closed position wherein the flexible foot imparts a closed biasing force against the bottom surface of the base thereby
  (i) forcing the head onto the radial channel to seal the radial channel, and
  (ii) forcing the body onto the center channel to seal the center channel;

(D) a cap member having an annular sidewall extending from a dispensing element, an inner surface of the annular sidewall having an attachment member adjustably attached to a reciprocal attachment member on an outer surface of the skirt;

(E) a metering chamber formed by an enclosed volume between the cap member and the base; and (F) the dispensing element permitting flow of a fluid from the metering chamber.

2. The dosing cap of claim 1 wherein the plug member has an open position wherein a force greater than the closed biasing force deforms and extends the foot against the bottom surface of the base thereby
  (i) separating the head from the radial channel;
  (ii) separating the body from center channel; and
  (iii) permitting flow of fluid content from within the flexible container through the channels and into the dosing chamber.

3. The dosing cap of claim 1 wherein the valve seat comprises
  a cup having a shape, and the center channel extends through the base from a bottom of the cup, and
  the body has a shape reciprocal to the shape of the cup.

4. The dosing cap of claim 1 wherein the plug member is an integral component composed of a single polymeric material.

5. The dosing cap of claim 1 wherein the plug member is composed of a material selected from the group consisting of a rubber, a silicone, an ethylene/a-olefin multi-block copolymer, and combinations thereof.

6. The dosing cap of claim 1 wherein adjustment of the attachment of the cap member to the skirt changes the volume of the metering chamber.

7. The dosing cap of claim 1 wherein the dispensing element is selected from the group consisting of a flip-top cap, a push-pull cap, a twist cap, and a flapper cap.

8. A dosing cap comprising:
(A) a collar member having an annular skirt depending from a base, an inner surface of the annular skirt having a securing member for securing the collar member to a neck of a container;
(B) the base comprising
  (i) a well having a well-wall and a floor, and
  (ii) an aperture on the well-wall;
(C) a flap member composed of a polymeric material, the flap member having a land, a wing and an elbow connecting the land to the wing,
  (i) the land attached to the floor,
  (ii) the wing extending along the well-wall, the flap member permitting fluid flow through the aperture;
(D) a cap member having an annular sidewall extending from a dispensing element, an inner surface of the annular sidewall having an attachment member adjustably attached to a reciprocal attachment member on an outer surface of the skirt;
(E) a metering chamber formed by an enclosed volume between the cap member and the base; and
(F) the dispensing element permitting flow of a fluid from the metering chamber.

9. The dosing cap of claim 8 wherein the flap member has a closed position; and
  the wing imparts a closed biasing force upon the sidewall to seal the aperture in the closed position.

10. The dosing cap of claim 9 wherein the flap member has an open position wherein a force greater than the closed biasing force flexes the wing at the elbow
  (i) separating the wing from the aperture; and
  (ii) permitting flow of fluid content from within the flexible container through the aperture and into the dosing chamber.

11. The dosing cap of claim 8 wherein the flap member is an integral component composed of a single polymeric material.

12. The dosing cap of claim 8 wherein the flap member is composed of a material selected from the group consisting of a rubber, a silicone, an ethylene/a-olefin multi-block copolymer, and combinations thereof.

13. The dosing cap of claim 8 wherein adjustment of the attachment of the cap member to the skirt changes the volume of the metering chamber.

14. The dosing cap of claim 8 wherein the dispensing element is selected from the group consisting of a flip-top cap, a push-pull cap, a twist cap, and a flapper cap.

* * * * *